United States Patent [19]
Kaburagi et al.

[11] Patent Number: 5,581,359
[45] Date of Patent: Dec. 3, 1996

[54] IMAGE PROCESSING APPARATUS AND METHOD

[75] Inventors: Hiroshi Kaburagi, Yokohama; Hiroyuki Ichikawa, Kawasaki; Hideaki Shimizu, Yokohama; Hiroyuki Yaguchi, Kawasaki; Yoshinori Abe, Tama; Yasuhiro Takiyama, Kawasaki, all of Japan

[73] Assignee: Canon Kabushiki Kaisha, Tokyo, Japan

[21] Appl. No.: 312,937

[22] Filed: Sep. 30, 1994

[30] Foreign Application Priority Data

Sep. 30, 1993 [JP] Japan .................. 5-244743
Sep. 30, 1993 [JP] Japan .................. 5-244745

[51] Int. Cl.$^6$ .................. G03G 15/20; H04N 1/46; H04N 1/21
[52] U.S. Cl. .................. 358/298; 358/515; 355/326 R
[58] Field of Search .................. 358/296, 300, 358/515, 518, 521, 530, 534; 355/326 R, 328; 382/167; 347/131, 232

[56] References Cited

U.S. PATENT DOCUMENTS

| 4,189,224 | 2/1980 | Sakai | 355/4 |
|---|---|---|---|
| 4,538,182 | 8/1985 | Saito et al. | 358/280 |
| 4,833,529 | 5/1989 | Yamamoto | 358/78 |
| 4,916,489 | 4/1990 | Tekeda et al. | 355/210 |
| 5,021,876 | 6/1991 | Kurita et al. | 358/75 |
| 5,060,059 | 10/1991 | Mori et al. | 358/79 |
| 5,067,160 | 11/1991 | Omata et al. | 382/1 |
| 5,117,284 | 5/1992 | Mori et al. | 358/79 |
| 5,187,521 | 2/1993 | Shimizu et al. | 355/202 |
| 5,305,069 | 4/1994 | Nakano | 355/326 R |
| 5,386,223 | 1/1995 | Saitoh et al. | 346/157 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

A two-color separating circuit separates an input image signal into two color signals R and K. In conformity with a color signal indicating the maximum value of the separated color signals, a color-mixture correcting circuit corrects the other color signal. The density of the color pixel formed by the corrected color signal is predicted, and the difference between the result of prediction and the color signal before correction is distributed among pixels of the same color surrounding this pixel. Accordingly, it is possible to provide an image processing apparatus for supplying an image forming apparatus, which collectively forms images of two colors, with an image signal subjected to processing capable of performing excellent color mixing without lowering the density of whichever of the two color-component images is formed last.

32 Claims, 13 Drawing Sheets

IMAGE PROCESSING APPARATUS AND METHOD

BACKGROUND OF THE INVENTION

This invention relates to an image processing apparatus and method. More particularly, the invention relates to an image processing apparatus and method for collectively forming images of at least two colors.

The applicant has proposed an image forming apparatus such as a digital copier (see U.S. Pat. No. 4,538,182) for reading a color original by a photoelectric transducer such as a color CCD, identifying an image area from color information indicative of the original, separating the image area into a red-component image and a black-component image, and forming the red-component image in the color red and the black-component image in the color black. In other words, the proposed image forming apparatus reproduces the image of a color original in two different colors.

Furthermore, the applicant has proposed a technique for forming an image in two or a plurality of colors at high speed. Specifically, the applicant has proposed a so-called collective transfer system in which the formation and development of a latent image in two or a plurality of colors on a single photosensitive drum is repeated, toner images of two or a plurality of colors are carried on the photosensitive drum simultaneously and the toner images are transferred to recording paper together at one time.

In the art described above, however, the fact that two (or a plurality of) images are formed on one photosensitive drum en bloc means that the toner of the image developed first intercepts the laser beam so that a sufficient latent-image potential cannot be obtained in the formation of the latent image developed next. The problem which arises is that the density of the image of this latter color component declines, as a result of which sufficient mixing of the colors cannot be achieved.

SUMMARY OF THE INVENTION

An object of the present invention is to provide an image processing apparatus and method in which excellent mixing of colors can be performed without diminishing the density of the subsequently formed color-image components in the above-described image forming system in which the formation and development of a latent image in two or a plurality of colors on a single photosensitive drum is repeated, toner images of two or a plurality of colors are carried on the photosensitive drum simultaneously and the toner images are transferred to recording paper together at one time.

Another object of the present invention is to apply a correction which takes the light-shielding characteristic of an image into consideration in a case where recording agents of at least two colors are superimposed to form an image.

According to the present invention, the foregoing objects are attained by providing an image processing apparatus for supplying image data to an image forming apparatus which forms an image by superimposing recording agents of at least two colors, comprising separating means for separating color image data into image data of at least two color components, correcting means for subjecting the image data separated from the color image data by the separating means to a correction which takes into consideration a light-shielding characteristic of the image formed, and distributing means for distributing, to pixels surrounding a pixel of interest, a difference between the image data corrected by the correcting means and image data before correction.

Further, the foregoing objects are attained by providing an image processing apparatus for supplying image data to an image forming apparatus which collectively forms images of at least two colors, comprising separating means for separating color image data into image data of at least two color components, first correcting means for correcting first color-component data separated from the color image data by the separating means, second correcting means for correcting second color-component data separated from the color image data by the separating means, comparing means for comparing a density value of the second color-component data corrected by the second correcting means and a density limit value, and control means for controlling correction of the first color-component data, which has been separated by the separating means, by the first correcting means in dependence upon results of the comparison performed by the comparing means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings. Though a copier having toners of the two colors red and black is described by way of example, the invention is not limited thereto but can be applied also to an image processing apparatus having any types of recording agents of two colors or more.

First Embodiment

Construction of copier

Figure 1:
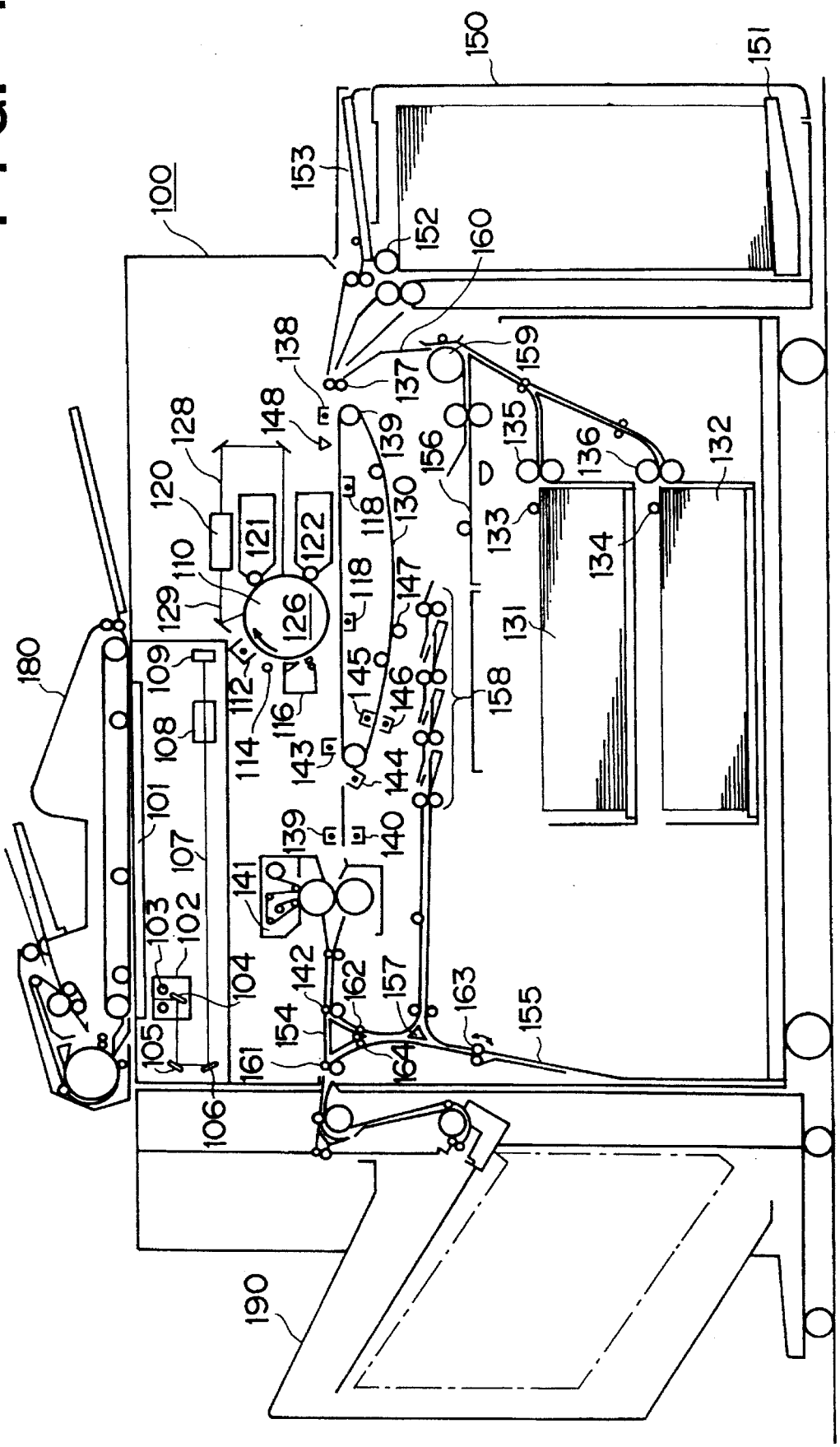
FIG. 1 is a diagram showing the construction of a copier which includes an image processing apparatus according to an embodiment of the present invention.

FIG. 1 is a diagram illustrating the construction of the copier according to the first embodiment.

As shown in FIG. 1, a copier has a main body 100 provided with a circulating-type automatic original feeder (hereinafter referred to as an "RDF") for feeding originals automatically, and a sorter 190. The arrangement is such that the RDF 180 and sorter 190 can be used on the main body 100 in any combination. The main body 100 is further equipped with a deck 150 capable of accommodating, say, 4000 sheets of recording paper. The deck 150 has a lifter 151 which rises in dependence upon the amount recording paper left in such a manner that the uppermost sheet of recording paper is always in contact with a feed roller 152. The main body 100 is further equipped with a manual feeder 153 capable of accommodating 100 recording sheets, by way of example.

Numeral 101 denotes a glass platen on which an original is placed. An original scanning unit 102, which is composed of an original illuminating lamp 103 and a scanning mirror 104, is scanned back and forth in a prescribed direction by a motor, not shown. Light 107 reflected from the original passes through scanning mirrors 104~106 and is formed as an image on a CCD sensor 109 by a lens 108.

An exposure controller 120, which includes laser elements (601 and 602 shown in FIG. 6) and polygon mirror scanners (603 and 604 shown in FIG. 6), irradiates a photosensitive drum 110 with laser beams 128 and 129 modulated on the basis of an image signal that has undergone predetermined image processing (described later) following conversion to an electric signal by the CCD sensor 109.

An image forming section 126 has the photosensitive drum 110 and a primary corona discharge device 112, red developer 121, black developer 122, transfer corona discharge device 118, cleaner 116 and pre-exposure lamp 114 arranged about the photosensitive drum 110 in the order mentioned along the direction of rotation of the drum. The photosensitive drum 110 is rotated in the direction of the arrow by a motor (not shown) and is charged to a prescribed potential by the primary corona discharge device 112. The drum is then irradiated with the laser beam 129 from the exposure controller 120, whereby an electrostatic latent image of the red component is formed on the drum. This red electrostatic latent image is then developed by the red developer 121.

Next, an electrostatic latent image of the black component is formed on the photosensitive drum 110 by irradiating the drum with the laser beam 128 from the exposure controller 120. This black electrostatic latent image is then developed by the red developer 122.

Meanwhile, recording paper supplied from an upper cassette 131 or lower cassette 132 by a pick-up roller 133 or 134 is fed to a transfer belt 130 by resist rollers 137 via a paper-feed roller 135 or 136. The toner images rendered visible by the transfer corona discharge device 118 are transferred to the recording paper conveyed to it by the transfer belt 130. Thus, the copier of this embodiment forms an image by repeating the formation and development of a latent image in each of two or a plurality of colors on a single photosensitive drum, carrying the toner images of two or a plurality of colors on the photosensitive drum simultaneously and transferring the toner images to recording paper together at one time.

After the transfer is carried out, the photosensitive drum 110 has residual toner cleaned off by the cleaner 116, after which residual electric charge is removed by the pre-exposure lamp 114.

The sheet of recording paper to which the toner images have been transferred separates from the transfer belt 130, the toner images are charged again by corona discharge devices 139, 140 prior to fixing, described below, and the toner images are fixed by application of pressure and heat in a fixing unit 141. The recording paper on which the toner images have been fixed is ejected to the exterior of the main body 100 by an ejecting roller 142.

An attracting corona discharge device 138 is for attracting the sheet of recording paper, which has been sent from the resist rollers 137, to the transfer belt 130. A transfer-belt roller 139 drives the transfer belt 130 and cooperates with the attracting corona discharge device 138 so that the recording paper is attracted to the transfer belt 130 by corona discharge.

A charge removing corona discharge device 143 facilitates the separation of the recording paper from the transfer belt 130. A separating corona discharge device 144 prevents disturbance of the image by a separating discharge when the recording paper is peeled off the transfer belt 130.

The corona discharge devices 139, 140 which operate prior to fixing prevent disturbance of the image by reinforcing the adsorbing force of the toners on the recording paper that has been separated from the transfer belt 130.

Transfer-belt charge removing corona discharge devices 145, 146 remove electric charge from the transfer belt 130 to electrostatically initialize the transfer belt 130. A belt cleaner 147 eliminates disturbance of the transfer belt 130.

A paper sensor 148 senses the leading edge of the recording paper fed on the transfer belt 130. The output of the sensor is used as a synchronizing signal in the paper-feed direction (sub-scan direction).

A paper ejecting flapper 154 changes over the path of recording paper that has been recorded on. The flapper 154 deflects the recording paper to a double-sided recording side/multiple-recording side or to an ejection side. A multiple-recording flapper 157 changes over the path between a double-sided recording path and a multiple-recording path. The recording paper is led to a reversal path 155 when the flapper 157 is tilted to the right and to a downward conveyance path 158 when the flapper 157 is tilted to the left.

More specifically, the recording paper sent to the double-sided recording side/multiple-recording side by the paper ejecting flapper 154 either is turned over by the multiple-recording flapper 157, reversal path 155 and a reversing roller 163 or is not turned over. In either case, the recording paper is then sent to the downward conveyance path to be introduced to a paper re-supply tray 156. On the other hand, recording paper sent to the ejection side by the paper ejecting flapper 154 is ejected to the exterior of the main body 100 by an ejecting roller 161.

Accordingly, at the time of double-sided recording (double-sided copying) or multiple recording (multiple copying), the paper ejecting flapper 154 is shifted upward so that recording paper on which an image has been recorded is sent to the double-sided recording side/multiple-recording side, whereby the recording paper eventually is received in the paper re-supply tray 156. The multiple-recording flapper 157 is tilted to the right in case of double-sided recording and to the left in case of multiple recording. Recording paper received in the paper re-supply tray 156 is introduced to the resist rollers 137 by a paper-feed roller 159 via a path 160 one sheet at a time from the bottom. The recording paper then undergoes recording on its reverse side or multiple recording.

In the case where the recording paper is ejected from the main body 100 upon being turned over, the paper ejecting flapper 154 is raised and the multiple-recording flapper 157 is tilted to the right, whereby recording paper on which recording has been performed is sent to the reversal path 155. When the trailing edge of the recording paper passes a first feed roller 162, the reversing roller 163 rotates so that the recording paper in the reversal path 155 is sent to a second feed roller 164. Accordingly, the recording paper turned over in the reversal path 155 is ejected to the exterior of the main body 100 by the ejecting roller 161.

Overview of processing

Figure 2:
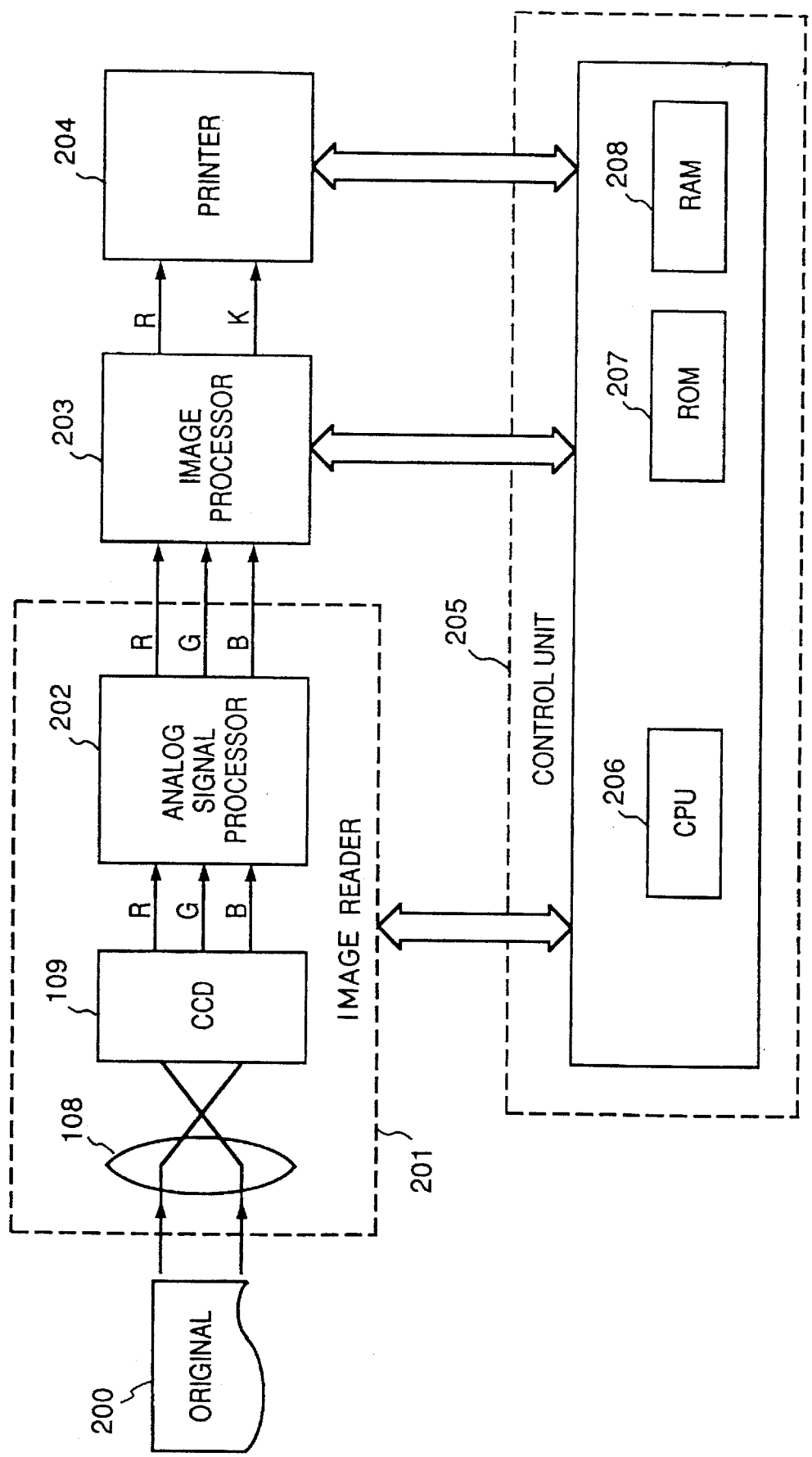
FIG. 2 is a block diagram showing the construction of a signal processing section according to this embodiment.

FIG. 2 is a block diagram illustrating the construction of the signal processing section of this embodiment.

As shown in FIG. 2, an image reader 201 includes the CCD sensor 109 and an analog-signal processing circuit 202. An image of an original 200 formed on the CCD sensor 109 by the lens 108 is converted into analog electric signals representing the light intensities of the color components R (red), G (green) and B (blue). These analog signals enter the analog-signal processing circuit 202.

The analog-signal processing circuit 202 subjects the R, G, B color components to such processing as a sample-and-hold operation and dark-level correction, and then effects an analog-to-digital conversion so as to output digital color-image signals.

An image processor 203, the details of which will be described later, subjects the color-image signals from the analog-signal processing circuit 202 to correction processing, such as a shading correction, color correction and γ-correction, which are required for the image reading system, as well as smoothing, edge emphasis and other processing.

A printing section 204, which includes the exposure controller 120 and image forming section 126, shown in FIG. 1, as well as a conveyance controller, records an image on recording paper on the basis of the image signal processed by the image processor 203.

A control unit 205 includes a CPU 206, a ROM 207 and a RAM 208. A program stored in the ROM 207 is executed by the CPU 206, whereby the image reader 201, image processor 203 and printer section 204 are controlled. In this way the overall copying sequence of the embodiment is controlled.

Image processor

Figure 3:
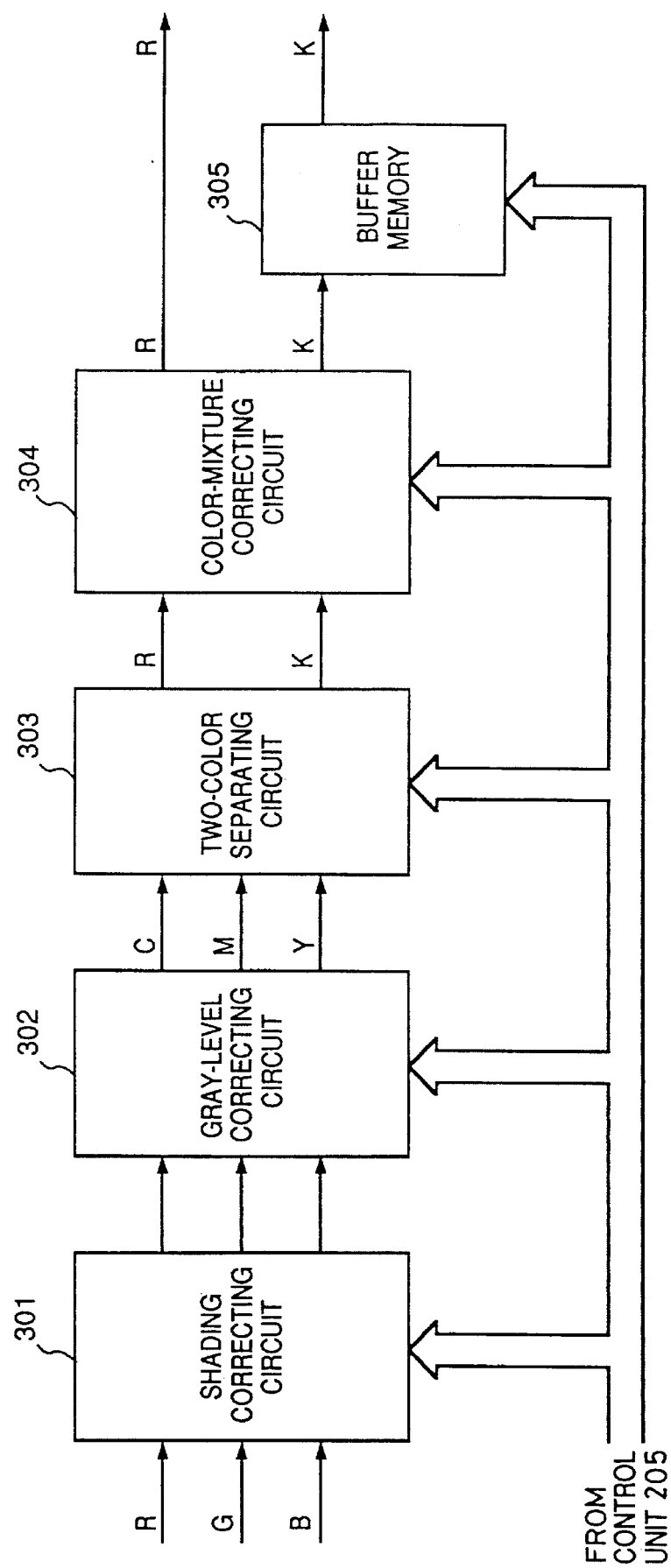
FIG. 3 is a block diagram showing the detailed construction of an image processor depicted in FIG. 2.

FIG. 3 is a block diagram illustrating the detailed construction of the image processor 203.

The digital image signals outputted by the analog-signal processing circuit 202 enter a shading correction circuit 301, which compensates for variance in the CCD sensor 109 and corrects the distribution-of-light characteristic of the original illuminating lamp 103.

The image signals that have been subjected to the shading correction enter a gray-level correcting circuit 302. Here the gray scale is corrected and a conversion is made from R, G, B luminance signals to C, M, Y density signals.

The image signals converted into density signals enter a two-color separating circuit 303, where the C, M, Y density signals are changed to signals which correspond to the toner colors possessed by the printer section 204. In the case of this embodiment, the C, M, Y density signals are converted to image signals of the colors red (R) and black (K).

The R and K signals enter a color-mixture correcting circuit 304. The latter subjects these signals to a correction for the purpose of obtaining an appropriate color mixture on the single photosensitive drum 110 and sends the resulting signals to the printer section 204.

It should be noted that the K signal is subjected to a prescribed delay by a buffer memory 305 in order to properly position the red- and black-component images on the photosensitive drum 110 on which these images are formed.

Color-mixture correcting circuit

Figure 4:
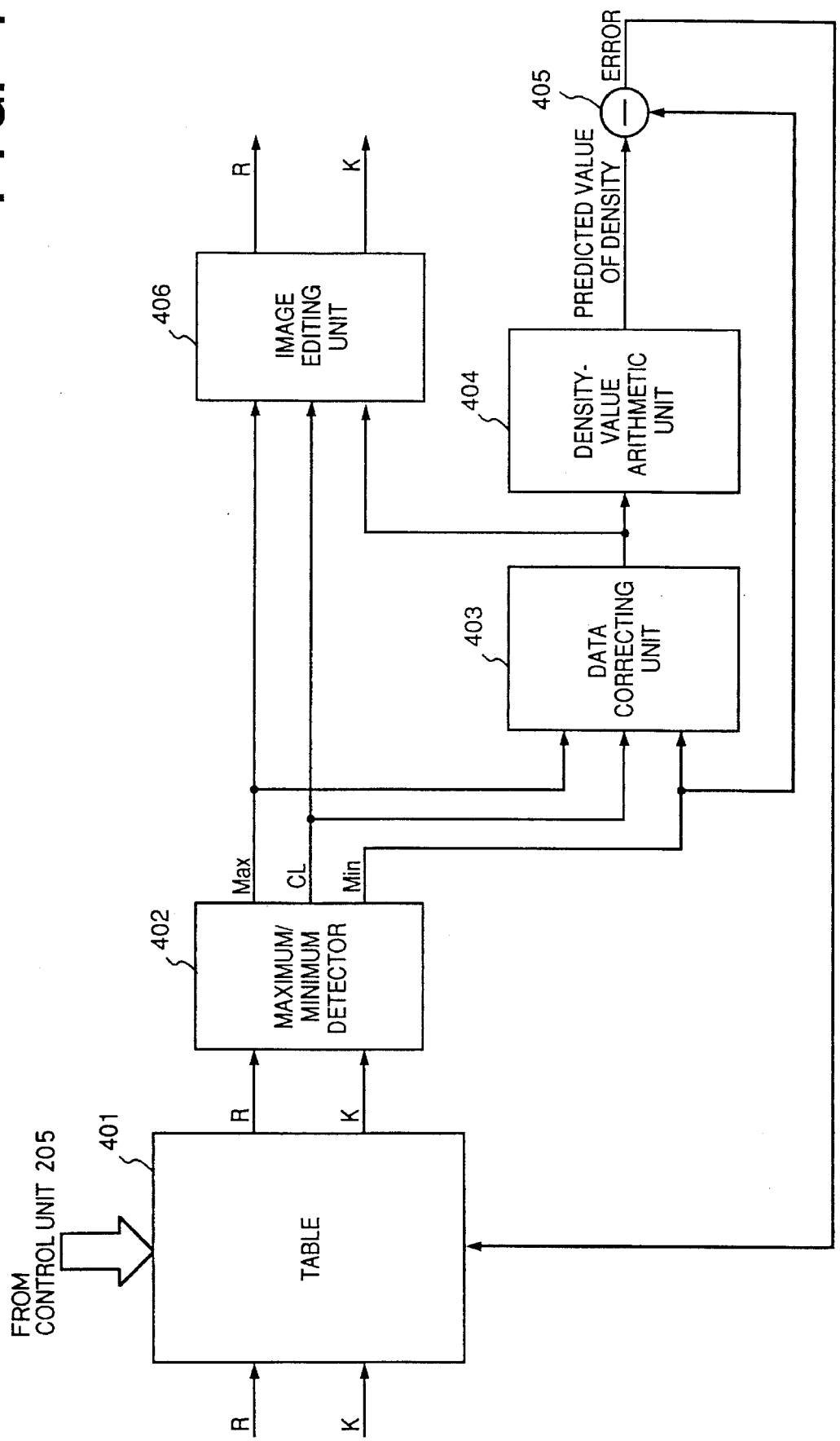
FIG. 4 is a block diagram showing the detailed construction of a color-mixture correcting circuit depicted in FIG. 3.

FIG. 4 is a block diagram showing the detailed construction of the color-mixture correcting circuit 304.

As shown in FIG. 4, the color-mixture correcting circuit 304 includes a table 401 constituted by a RAM or the like. The table 401 is for adding an error component, described later, to the R and K signals which have entered from the two-color separating circuit 303 in synch with a pixel clock from the control unit 205. A maximum/minimum detector 402 detects and outputs a maximum value Max and a minimum value Min of the R and K signals, of a pixel of interest, which have entered from the table 401, and simultaneously outputs also a signal CL indicating whether the maximum value Max is of the color red or black.

The Min data, Max data and the signal CL outputted by the maximum/minimum detector 402 enter a data correcting unit 403, which applies a correction that takes the light-shielding characteristic of the toner images into account to the Min data in conformity with the color (red or black) indicated by the Max data. If the signal CL is indicative of black, i.e., in a case where the Max data is black, which is formed later, a correction is applied to diminish the density of red, namely the Min data, which is formed first and has an effect upon the black image. If the signal CL is indicative of red, i.e., in a case where the Max data is red, which is formed first, a correction is applied to increase the density value of the Min data in such a manner that black, which is formed later, will be affected by the light-shielding characteristic as little as possible.

The corrective data thus obtained is fed into an image editing unit 406 together with the Max data and signal CL. On the basis of the signal CL, the image editing unit 406 allocates the Max data and corrective data to the R signal or K signal.

Meanwhile, the corrective data outputted by the data correcting unit 402 enters a density-value arithmetic unit 404 as well. The arithmetic unit 404, which is a look-up table constituted by a ROM or the like, predicts the density value of an image that will be developed on the photosensitive drum 110. The predicted value of density from the arithmetic unit 404 enters a subtractor 405, which calculates the difference between this value and the value indicated by the Min data. This difference is fed back to the table 401 as an error which could not be corrected for and is distributed to pixels of the same color component (e.g., pixels of R) surrounding the pixel of interest. That is, the table 401 adds this error to the input data. The result of adding this error to the R signal or K signal in dependence upon the signal CL is stored in the table 401 beforehand and the result is read out of the table in synch with the pixel clock.

Figure 7:
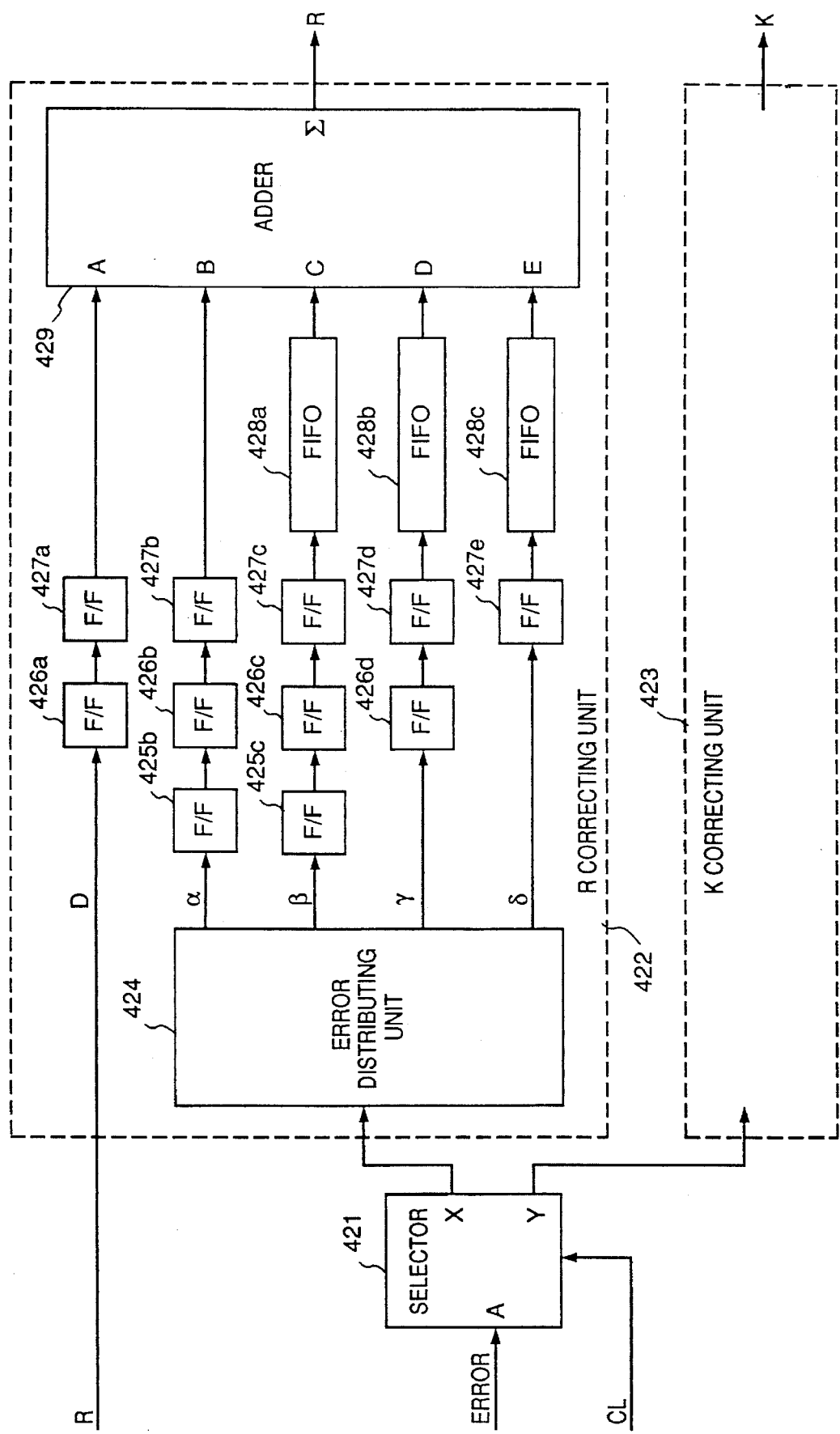
FIG. 7 is a block diagram showing the detailed constitution of a table shown in FIG. 4.

The block diagram of FIG. 7 will be used to describe a modification in which the function of the table 401 is realized by hardware.

As shown in FIG. 7, a selector 421 sends the error from the subtractor 405 to an R corrector 422 or K corrector 423, depending upon the signal CL. More specifically, the error is sent to the K corrector 423 when the signal CL indicates red and to the R corrector 422 when the signal CL indicates black.

The R corrector 422 includes an error distributing unit 424, a plurality of flip-flops ("F/F's") 426a–426d, 427a–427e, a plurality of FIFO memories and an adder 429. The K corrector 423 has a construction identical with that of the R corrector 422 and the details thereof are not shown.

Figure 8:
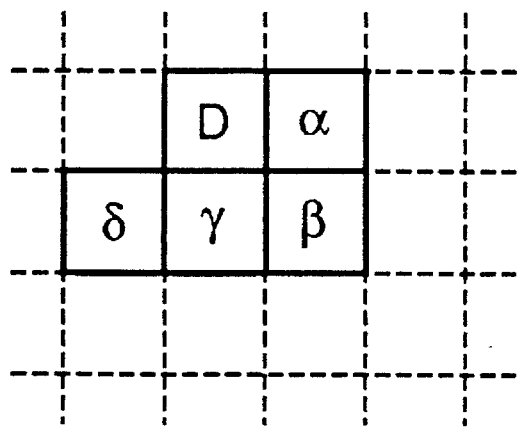
FIG. 8 is a diagram showing an example of pixels distributing an error in the first embodiment.

The error distributing unit 424 distributes the error from the selector 421 in dependence upon the pixels to which the error is to be distributed. FIG. 8 is a diagram showing an example of pixels which distribute the error. With a pixel D of interest serving as a reference pixel, error is distributed to a pixel α one pixel ahead in the main-scan direction and to three pixels δ, γ, β one line ahead. One example of the distribution ratio is given by the following equation, though this does not represent a limitation on the invention:

$$\alpha:\beta:\gamma:\delta = 2/6 : 1/6 : 2/6 : 1/6$$

The errors thus distributed are each delayed a prescribed amount in the main-scan direction by the F/Fs synchronized to the pixel clock entering from the control unit 205. Furthermore, the errors corresponding to the pixels β~δ are each delayed one line by the FIFO memories synchronized to the pixel clock.

The pixel D of interest also is delayed in the main-scan direction by F/Fs 426a, 427a and enters the adder 429 along with the delayed errors. The adder 429 outputs the sum total of the errors and data indicative of the pixel of interest input thereto.

It should be noted that the pixels distributing the error are not limited to those shown in FIG. 8. For example, the pixel may be pixel α only, and ½ may be allocated to each of the pixels α and γ. Pixels outwardly of the pixels α~δ may also be included. In other words, it will suffice if the error is distributed appropriately among the pixels surrounding the pixel of interest.

Furthermore, the density-value arithmetic unit 404 may be deleted so that the subtractor 405 obtains the difference between the image data before correction and the image data after correction, with the difference being inputted to the table 401. Effects almost the same as those described above can be expected. Of course, using the density-value arithmetic unit 404 makes it possible to achieve highly precise control of density by predicting the density of the image actually formed. If the arithmetic unit 404 is deleted, however, the circuitry can be simplified and the cost of the apparatus reduced correspondingly.

Thus, the light-shielding characteristic of the color-component pixel formed first is taken into consideration to correct the density of separated color-component pixel data. Furthermore, the difference between the predicted density (or corrected density value) of a pixel, which will be formed on the photosensitive drum when a color-component pixel whose density has been corrected is developed, and the density value before correction is distributed to pixels of the same color component surrounding this pixel. As a result, excellent color mixing can be performed on a single photosensitive drum without lowering the density of the color-component pixel formed subsequently.

It should be noted that the distribution of the error data may be performed in two dimensions or in one dimension. Further, a correction may be applied not only to one color but to two colors and the error data may be distributed to respective ones of the color components.

Second Embodiment

An image processing apparatus according to a second embodiment of the present invention will now be described. Components in the second embodiment similar to those of the first embodiment are designated by like reference characters and need not be described again.

The correction of data which takes the light-shielding characteristic into account need not be applied to the smaller of the red and black data, namely to the Min data. As will be described below, the correction can be applied solely to the black data. However, in collective transfer of two colors, the assumption is that the image formed after the first is black. In a case where image formation is in the order of black→red, the correction would be applied to the red data of the image formed second.

Figure 5:
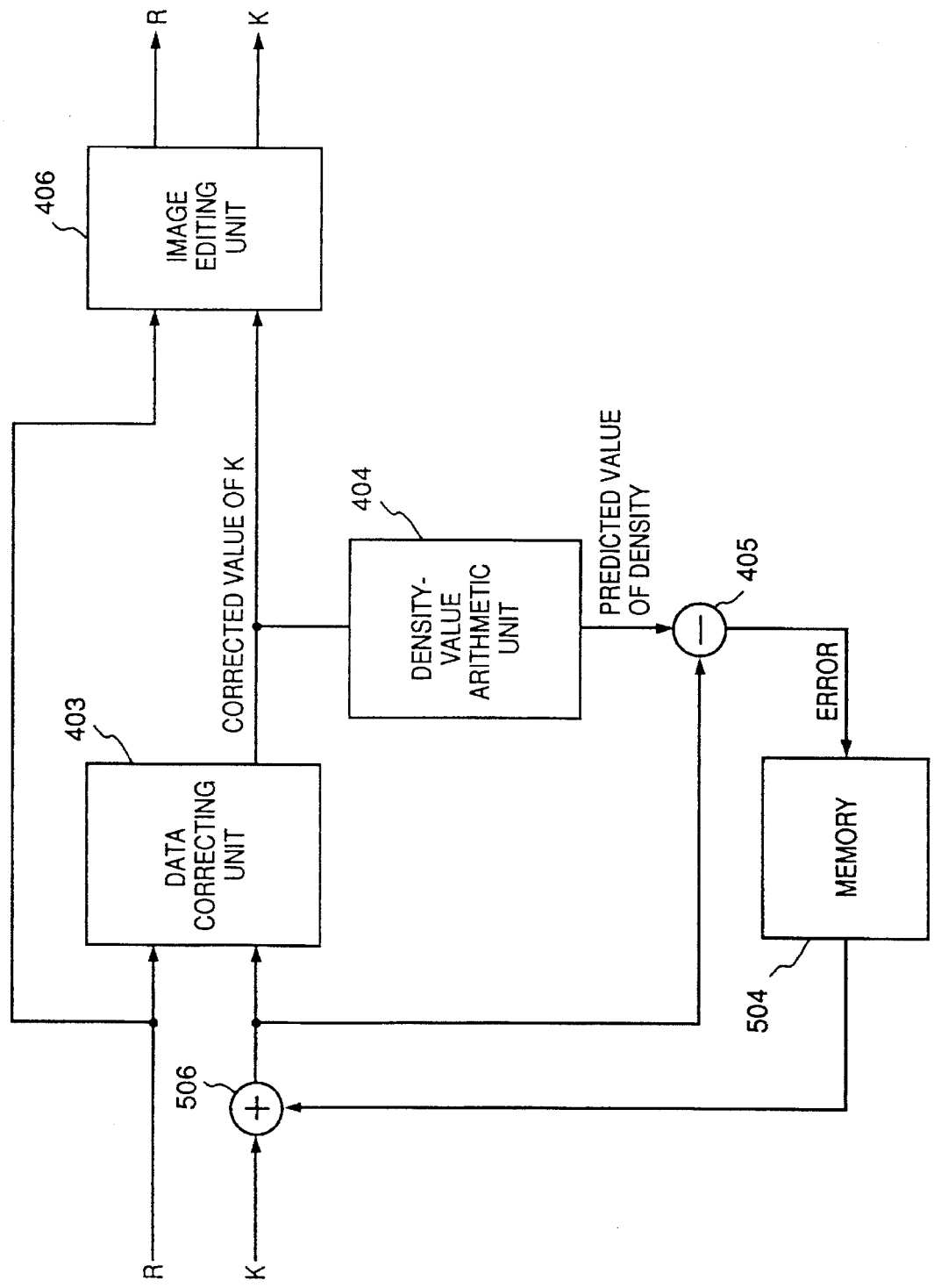
FIG. 5 is a block diagram showing the detailed construction of a color-mixture correcting circuit according to a second embodiment of the present invention.

FIG. 5 is a block diagram illustrating the detail construction of the color-mixture correcting circuit 304 according to the second embodiment.

As shown in FIG. 5, the K signal outputted by the two-color separating circuit 303 is added to a signal from a memory 504 by an adder 506, after which the sum is inputted to the data correcting unit 403 along with the signal R outputted by the two-color separating circuit 303.

The subtractor 405 outputs the difference between the predicted density value of the K-component pixel developed on the photosensitive drum 110 and the output of the adder 506. This difference is the error which could not be corrected. This error is temporarily stored in the memory 504 and is sent from the memory 504 to the adder 506 at a prescribed timing in order to be added to the K signal. Accordingly, the error is added to a pixel contiguous to the pixel D of interest, e.g., to the pixel α of FIG. 8.

The data correcting unit 403 outputs K data that has been subjected to a density correction by processing similar to that of the first embodiment. The corrected K data enters the image editing unit 406 along with the R signal, and the unit 406 outputs the R signal and the K signal.

Thus, in accordance with this embodiment, the pixels capable of distributing the error are restricted. However, effects almost the same as those of the first embodiment can be obtained and the table 401 of the first embodiment is no longer necessary. This makes possible a less costly circuit arrangement.

Modification of Second Embodiment

Figure 11:
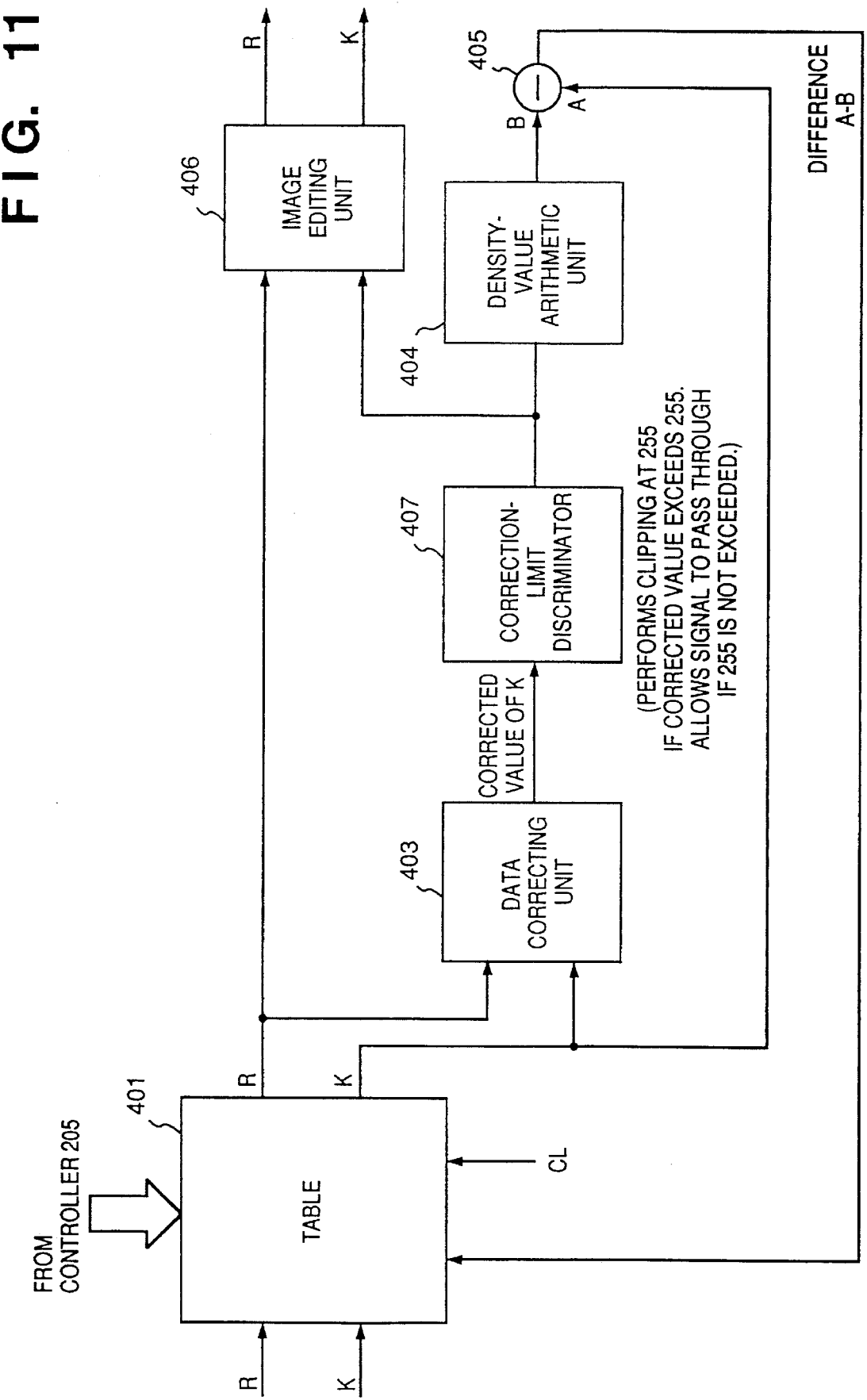
FIG. 11 is a block diagram illustrating the detailed construction of a modification of the color-mixture correcting circuit according to the modification of the second embodiment.

FIG. 11 is a block diagram illustrating the detailed construction of a modification of the color-mixture correcting circuit 304 according to the second embodiment.

On the basis of the values of the R and K signals, of the pixel of interest, which have been outputted by the table 401, the data correcting unit 403 applies a correction to the K signal of the second exposure color in synchronism with the image clock from the control unit 205. That is, a correction for increasing the density value of black is applied in order to arrange it so that black, which is formed later, will be affected by the light-shielding characteristic of red, which is formed first, as little as possible.

Since the value of the K signal outputted by the data correcting unit 403 is an ideal corrective value, there is the possibility that it may exceed the correctable limit value. Accordingly, a correction-limit discriminator 407 determines whether the output of the data correcting unit 403 has exceeded the limit value (e.g., 255). If the limit value has been exceeded, the discriminator 407 outputs the limit value(e.g., 255). Otherwise, the discriminator 407 allows the output of the data correcting unit 403 to pass. The corrective data thus obtained is outputted via the image editing unit 406.

The data outputted by the correction-limit discriminator 407 enters the density-value arithmetic unit 404 as well. The arithmetic unit 404, which is a look-up table constituted by a ROM or the like, predicts the density value of an image that will be developed on the photosensitive drum 110. The predicted value of density from the arithmetic unit 404 enters the subtractor 405, which calculates the difference between this value and the value of the K signal outputted by the table 401. This difference is returned to the table 401 as an error which could not be corrected for and is distributed to a pixel of the same color component (e.g., the next pixel) surrounding the pixel of interest. That is, the table 401 adds this error to the input data the table 401, which contains a memory for recording the result of adding this error, adds on the error and outputs the result in synch with the pixel clock.

Figure 12:
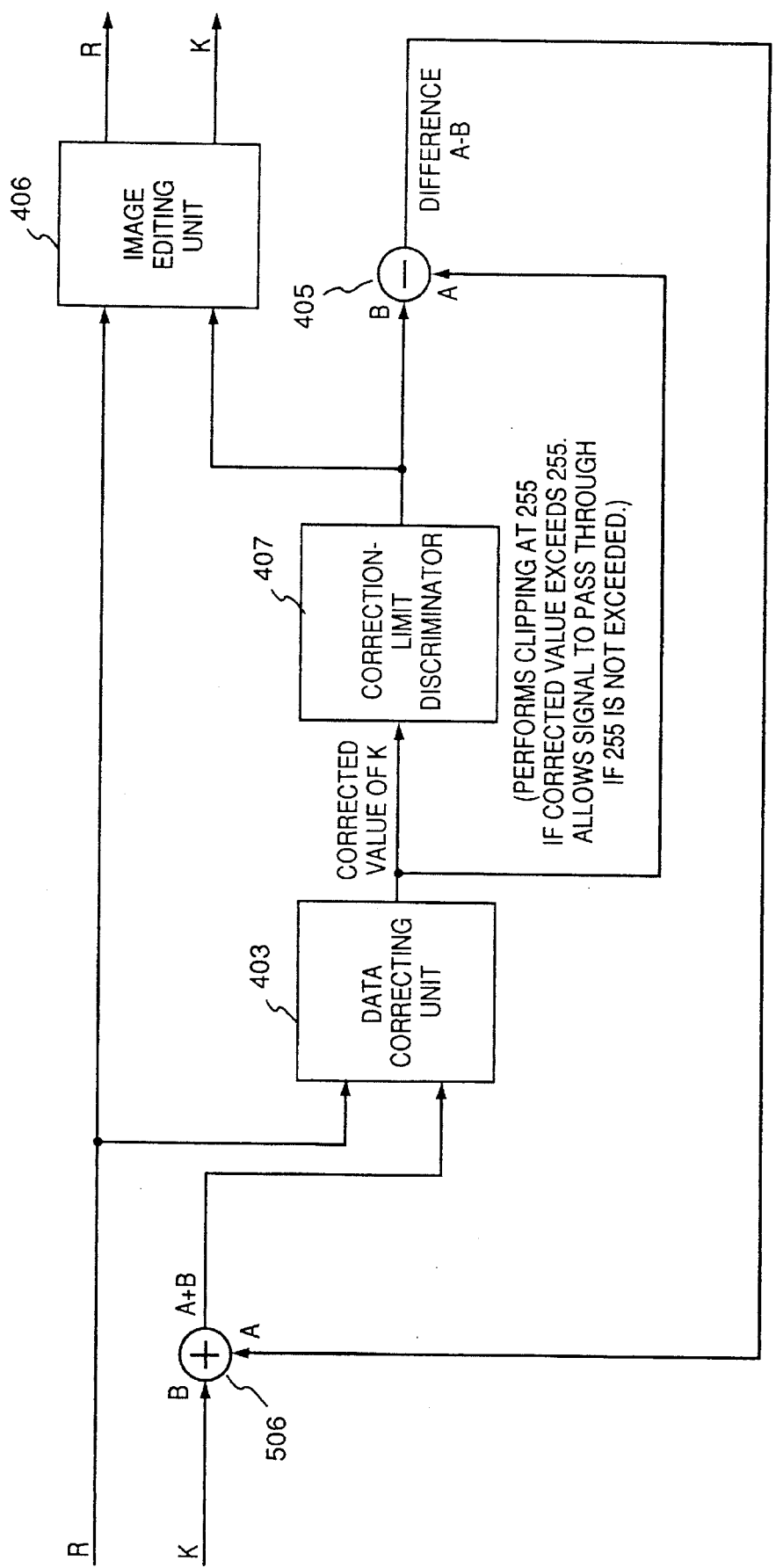
FIG. 12 is a block diagram illustrating the detailed construction of a modification of the color-mixture correcting circuit according to the modification of the second embodiment.

As shown in FIG. 12, effects similar to the above can be obtained by deleting the density arithmetic unit 404, finding the difference between the output of the data correcting unit 403 and the output of the correction-limit discriminator 402 and feeding back this difference. Of course, using the density arithmetic unit 404 makes it possible to perform more precise control of density since the density of the image actually formed is predicted. However, if the density arithmetic unit 404 is dispensed with, the circuitry is simplified and apparatus cost lowered correspondingly. Furthermore, by changing the table 401 to the adder 506, as shown in FIG. 12, the pixels capable of distributing the error are limited but a further reduction in apparatus cost can be achieved.

Third Embodiment

An image processing apparatus according to a third embodiment of the present invention will now be described. Components in the third embodiment similar to those of the first embodiment are designated by like reference characters and need not be described again.

According to this embodiment, the density of an image formed on the photosensitive drum is not predicted by the density-value predicting unit 404 in the manner described in each of the foregoing embodiment. Rather, the state of adhesion of the second toner, namely the density thereof, is sensed directly by a sensor.

Figure 6:
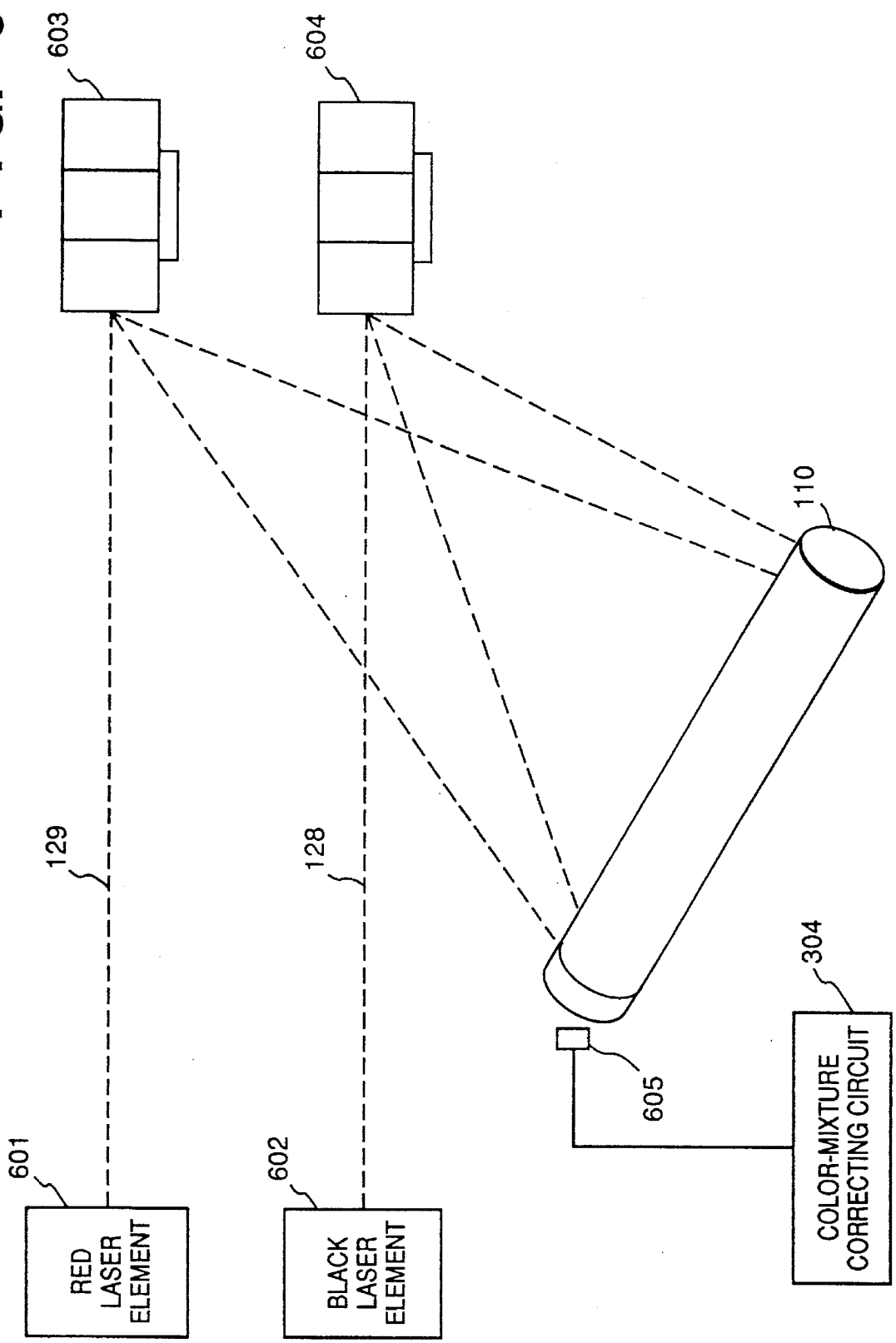
FIG. 6 is a diagram showing an arrangement for performing a color-mixture correction according to a third embodiment of the present invention.

FIG. 6 is a diagram showing an arrangement for performing the color-mixture correction of this embodiment.

The color-mixture correcting circuit 304 shown in FIG. 6 employs a sensor 605 to obtain the density of the second toner adhering to the photosensitive drum 110. The correction of the color mixture is performed by sending the results to the subtractor 405.

Fourth Embodiment

An image processing apparatus according to a fourth embodiment of the present invention will now be described. Components in the fourth embodiment similar to those of the first embodiment are designated by like reference characters and need not be described again.

Figure 9:
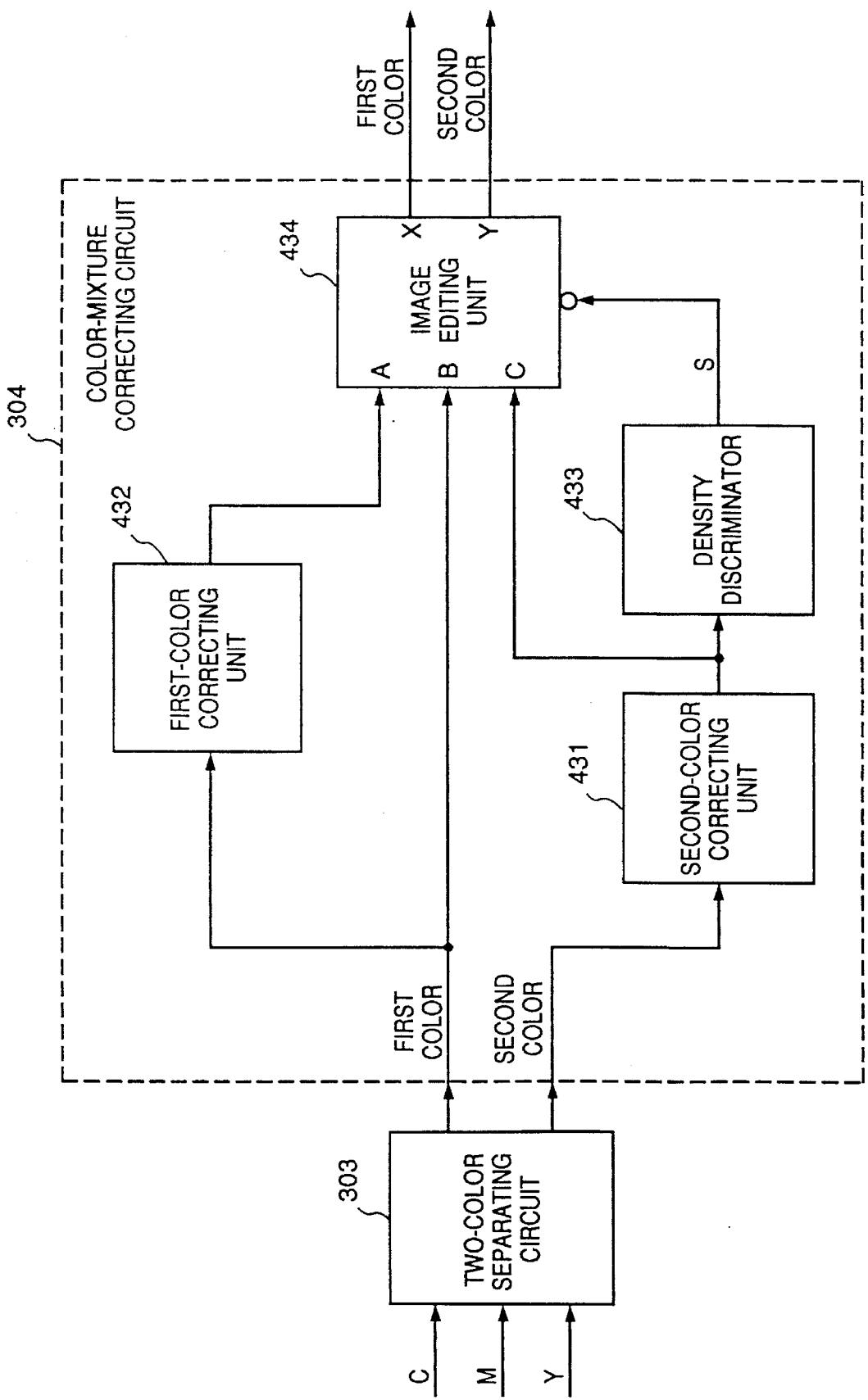
FIG. 9 is a block diagram showing the detailed construction of a color-mixture correcting circuit according to a fourth embodiment of the present invention.

FIG. 9 is a block diagram showing the detailed construction of the color-mixture correcting unit 304 according to the fourth embodiment.

The two-color separating circuit 303 shown in FIG. 3 outputs a first color signal, which is an image signal representing the image of the color component (first color) formed first, and a second color signal, which is an image signal representing the image of the color component (second color) formed second. The first color signal enters a first-color correcting unit 432 and an image editing unit 434, and the second color signal enters a second-color correcting unit 431.

In a case where the toner of the first color has been affixed to the photosensitive drum 110, the second-color correcting unit 431 to which the second color signal has been applied executes processing to correct a state in which there is insufficient formation of the latent image on the photosensitive drum 110 by the second color signal. More specifically, in conformity with the density of the image signal of the latent image formed first, the second-color correcting unit 431 increases the density value of the image signal which forms the latent image second. The result enters a density discriminator 433.

The density discriminator 433 determines whether the density value of the entering corrected second color signal has exceeded a correction limit value. In general, there is a limit (e.g., "255") upon the density value of an image signal that is capable of forming a latent image. Accordingly, if its input has exceeded this limit value, the density discriminator 433 outputs a signal S to the image editing unit 434.

In a case where the signal S from the density discriminator 433 indicates that the limit value is being exceeded, the image editing unit 434 outputs the corrected first color signal, which has entered from the first-color correcting unit 432, and the corrected second color signal, which has entered from the second-color correcting unit 431. On the other hand, if the signal S from the density discriminator 433 indicates that the limit value is not being exceeded, then the image editing unit 434 outputs the uncorrected first color signal, which has entered from the two-color separating circuit 303, and the corrected second-color signal from the second-color correcting unit 431.

Here the first-color correcting unit 432 does not perform the correction for increasing the density value of the image signal; this is performed by the second-color correcting unit 431. Rather, the first-color correcting unit 432 applies a correction to decrease the density value of the image signal. In other words, if the output value of the second color-color correcting unit 431 has exceeded the limit value, the density value of the first color signal is reduced but that of the second color signal is held below the correction limit. As a result, the balance (color-mixture ratio) between the first and second colors becomes equal to that of the original data so that the color balance can be maintained.

Thus, first a correction is carried out to increase the density of the second color (the color which forms the latent image second) of the two separated colors, then it is determined whether or not the result of the correction exceeds the correction limit. If the limit is exceeded, the density of the second color is fixed to the correction limit value and a correction is applied to lower the density of the first color (the color which forms the latent image first), whereby a density correction is performed in such a manner that the color-mixture ratio is rendered equal to that of the original data. As a result, an excellent color mixture can be obtained on a single photosensitive drum without reducing the density of the color-component image formed second.

Modification of Fourth Embodiment

Figure 13:
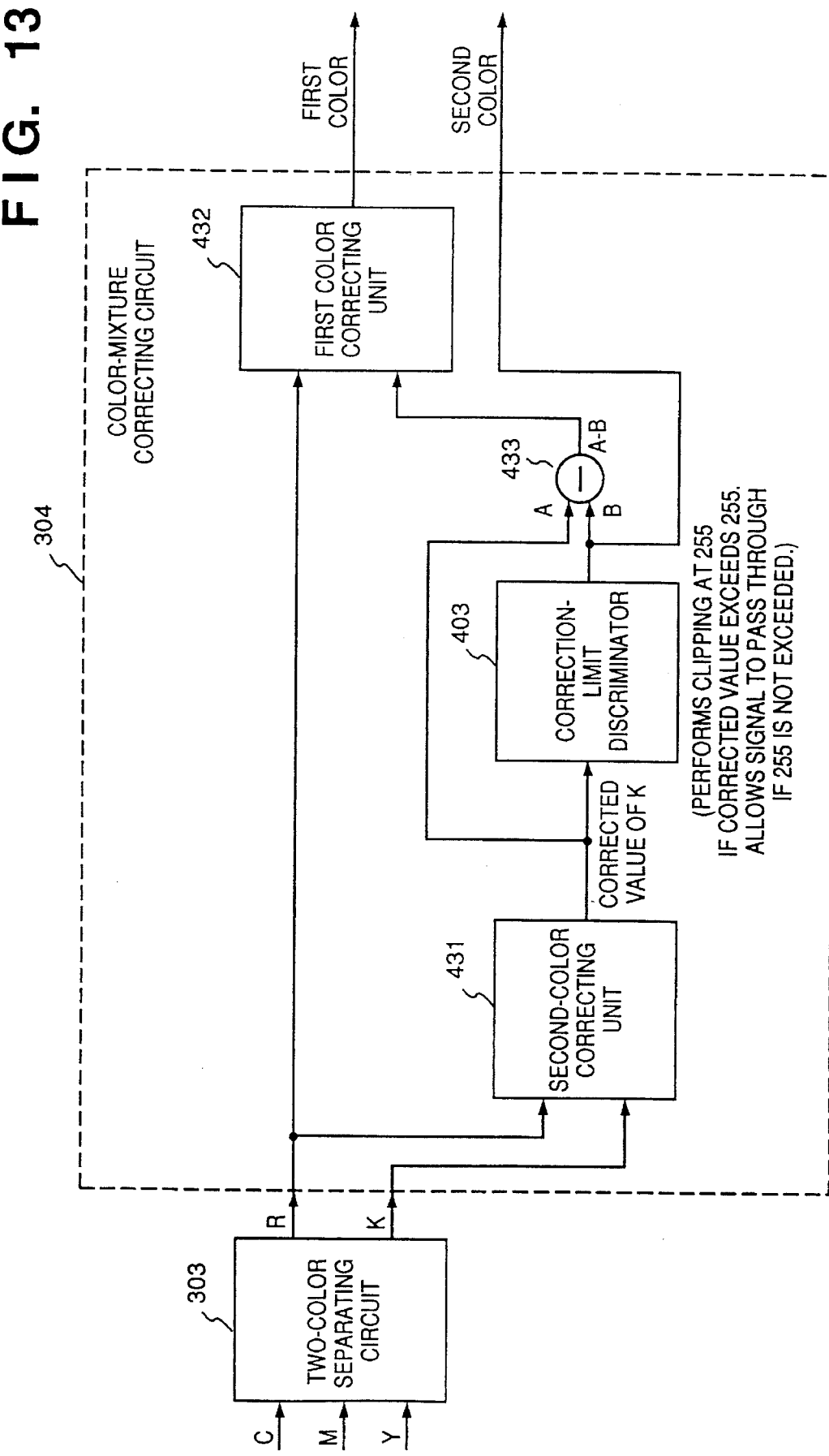
FIG. 13 is a block diagram illustrating the detailed construction of a modification of the color-mixture correcting circuit according to the modification of the fourth embodiment.

FIG. 13 is a block diagram illustrating the detailed construction of a modification of the color-mixture correcting circuit 304 according to the fourth embodiment.

The color separating circuit 303 shown in FIG. 13 outputs a first color signal, which is an image signal of a color component (first color) formed first, and a second color signal, which is an image signal of a color component (second color) formed next. The first color signal enters the first color correcting unit 432 and the second color correcting unit 431, and the second color signal enters the second color correcting unit 431.

In a case where the toner of the first color is adhering to the photosensitive drum 110, the second color correcting unit 431 to which the second color signal has been applied executes processing to correct a state in which the formation of a latent image on the photosensitive drum 110 by the second color signal is inadequate. More specifically, the density value of the image signal which forms the latent image later is increased in conformity with the density of the image signal of the latent image formed first. The result is inputted to the correction-limit discriminator 403.

In general, there is a limit (e.g., "255") upon the density value of an image signal that is capable of forming a latent image. Accordingly, a subtractor 433 calculates the difference between the output of the second color correcting unit 431 and the correction-limit discriminator 403 and outputs the difference to the first color correcting unit 432 as an error which could not be corrected.

The fist color correcting unit 432 applies a correction to the first color signal on the basis of the input from the subtractor 433. For example, when the value of the signal from the subtractor 433 is zero, no correction is applied to the first color signal on the assumption that a correction was applied by the second color correcting unit 431. However, when the signal from the subtractor 433 has a certain value, it is judged that the second color correcting unit 431 applied no correction and, hence, the first color correcting unit 432 applies a correction to lower value of the first color signal. In other words, the first color correcting unit 432 performs control to change the amount of correction in dependence upon the signal value from the subtractor 433.

Figure 10:
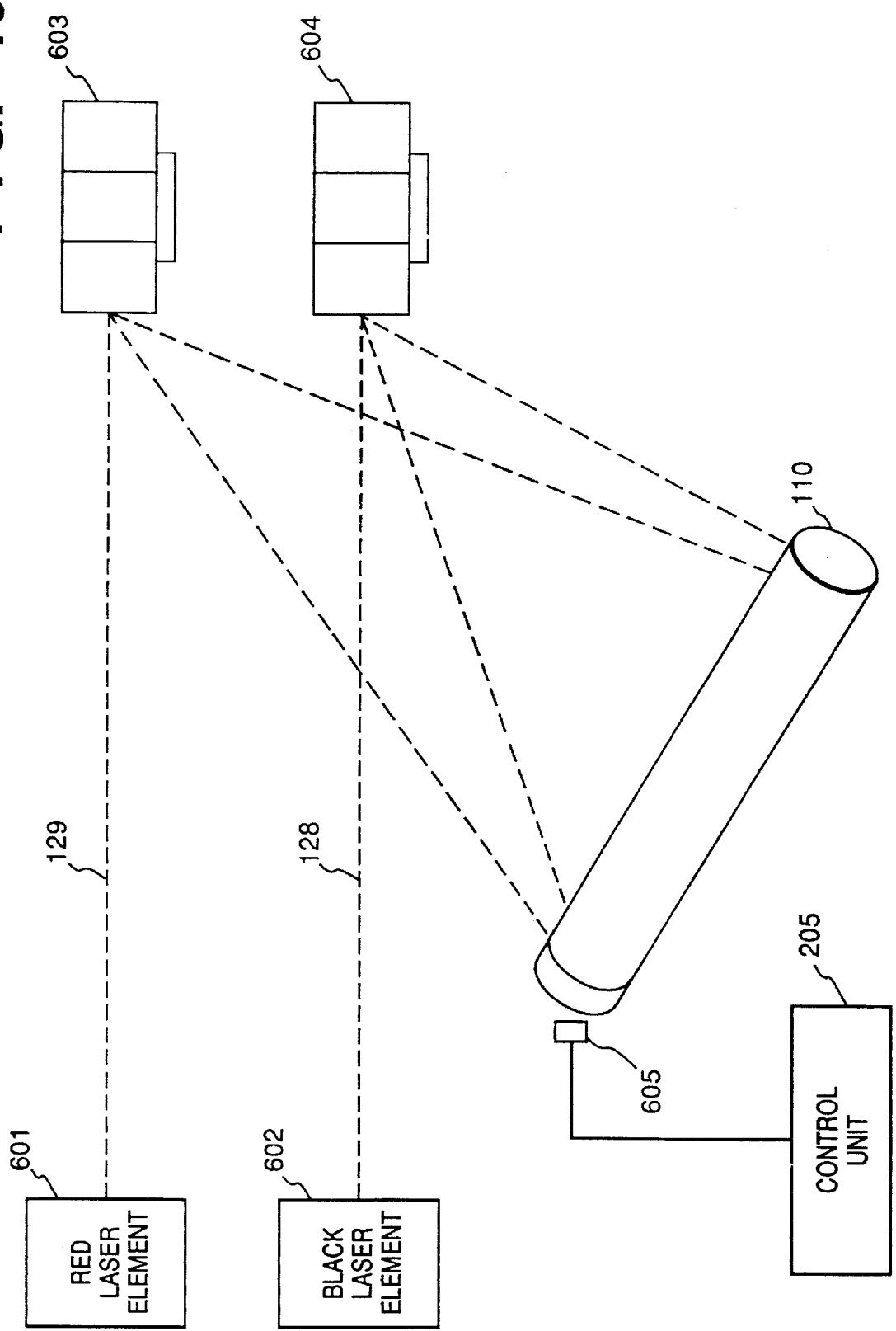
FIG. 10 is a diagram showing another arrangement for performing a color-mixture correction according to a modification of the fourth embodiment of the present invention.

FIG. 10 is a diagram illustrating a modification for performing the above-described correction of color mixture.

The control unit 205 in FIG. 10 uses the sensor 605 to measure the state of the toner affixed to the photosensitive drum 101. The correction is applied is accordance with the output of the sensor 605. More specifically, on the basis of the output signal from the sensor 605, the control unit 205 calculates the amount of attenuation of exposure in the formation of the latter latent image and feeds back the result to the signals which drive the red laser element 601 and the black laser element 602, thereby performing a color-mixture correction similar to that described above.

By adopting this arrangement, effects almost the same as those of the first embodiment are obtained. In addition, even if the system is in an unstable state in terms of processing, as is the case immediately after the apparatus is turned on, information can be obtained in real time to make possible highly accurate control.

It should be noted that the present invention is not limited to collective transfer of two colors obtained by separation into the two colors of red and black but is applicable also to three or more colors such as red, blue and black. Further, the image forming method is not limited to use of toner but may employ other recording agents as well.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for supplying image data to an image forming apparatus which forms an image by superimposing recording agents of at least two colors, comprising:

separating means for separating color image data into image data of at least two color components;

correcting means for subjecting the image data separated from the color image data by said separating means to a correction which takes into consideration a light-shielding characteristic of an image formed in accordance with one of at least two color components; and distributing means for distributing, to at least one pixel surrounding a pixel of interest, a difference between the image data corrected by said correcting means and image data before correction.

2. The apparatus according to claim 1, wherein said correcting means applies a correction which takes into consideration a light-shielding characteristic of a color-component image formed first.

3. The apparatus according to claim 2, wherein said correcting means senses maximum image data in the image data separated by said separating means and applies a correction to this maximum image data.

4. The apparatus according to claim 3, wherein when the sensed maximum image data is image data of a color component whose image is formed first, said correcting means applies a correction to lower the density value of this image data, and when the sensed maximum image data is image data of a color component whose image is formed thereafter, said correcting means applies a correction to increase the density value of this image data.

5. The apparatus according to claim 1, wherein said distributing means partitions said difference at a prescribed ratio conforming to pixels which are the object of distribution and adds results of partitioning to image data of the pixels which are the object of distribution.

6. The apparatus according to claim 5, wherein the pixels which are the object of distribution are pixels adjacent to the pixel of interest.

7. The apparatus according to claim 5, wherein the pixels which are the object of distribution are pixels of the same color component adjacent to the pixel of interest.

8. An image processing apparatus for supplying image data to an image forming apparatus which forms an image by superimposing recording agents of at least two colors, comprising:

separating means for separating color image data into image data of at least two color components;

correcting means for subjecting the image data separated from the color image data by said separating means to a correction which takes into consideration a light-shielding characteristic of an image formed in accordance with one of at least two color components; and distributing means which, in a case where image data corrected by said correcting means exceeds a correction limit, is for distributing a difference between a density limit value and the image data to at least one pixel surrounding a pixel of interest.

9. The apparatus according to claim 8, wherein said correcting means applies a correction which takes into consideration a light-shielding characteristic of a color-component image formed first.

10. The apparatus according to claim 9, wherein among the image data separated by said separating means, said correcting means applies a correction to image data of a color-component image formed thereafter.

11. The apparatus according to claim 10, wherein said correcting means applies a correction to increase the density value of the image data of each color component whose image is formed thereafter.

12. The apparatus according to claim 8, wherein said distributing means partitions said difference at a prescribed ratio conforming to pixels which are the object of distribution and adds results of partitioning to image data of the pixels which are the object of distribution.

13. The apparatus according to claim 12, wherein the pixels which are the object of distribution are pixels adjacent to the pixel of interest.

14. The apparatus according to claim 12, wherein the pixels which are the object of distribution are pixels of the same color component adjacent to the pixel of interest.

15. The apparatus according to claim 8, wherein said correcting means has:

first correcting means for correcting first color-component data separated from the color image data by said separating means; and second correcting means for correcting second color-component data separated from the color image data by said separating means;

said second correcting means applying a correction to increase the density value of the second color-component image data upon taking into consideration a light-shielding characteristic of the first color-component image.

16. An image processing apparatus for supplying image data to an image forming apparatus which forms an image by superimposing recording agents of at least two colors, comprising:

separating means for separating color image data into image data of at least two color components;

correcting means for subjecting the image data separated from the color image data by said separating means to a correction which takes into consideration a light-shielding characteristic of an image formed in accordance with one of at least two color components;

predicting means for predicting density of an image formed by the image data corrected by said correcting means; and distributing means for distributing, to at least one pixel surrounding a pixel of interest, a difference between results of prediction by said predicting means and image data before correction.

17. The apparatus according to claim 16, wherein said correcting means applies a correction which takes into consideration a light-shielding characteristic of a color-component image formed first.

18. The apparatus according to claim 17, wherein said correcting means senses maximum image data in the image data separated by said separating means and applies a correction to this maximum image data.

19. The apparatus according to claim 18, wherein when the sensed maximum image data is image data of a color component whose image is formed first, said correcting means applies a correction to lower the density value of this image data, and when the sensed maximum image data is image data of a color component whose image is formed thereafter, said correcting means applies a correction to increase the density value of this image data.

20. The apparatus according to claim 16, wherein said distributing means partitions said difference at a prescribed ratio conforming to pixels which are the object of distribution and adds results of partitioning to image data of the pixels which are the object of distribution.

21. The apparatus according to claim 20, wherein the pixels which are the object of distribution are pixels adjacent to the pixel of interest.

22. The apparatus according to claim 20, wherein the pixels which are the object of distribution are pixels of the same color component adjacent to the pixel of interest.

23. An image processing apparatus for supplying image data to an image forming apparatus which collectively forms images of at least two colors, comprising:

separating means for separating color image data into image data of at least two color components;

first correcting means for correcting first color-component data separated from the color image data by said separating means;

second correcting means for correcting second color-component data separated from the color image data by said separating means;

comparing means for comparing a density value of the second color-component data corrected by said second correcting means and a density limit value; and control means for controlling correction of the first color-component data, which has been separated by said separating means, by said first correcting means in dependence upon results of the comparison performed by said comparing means.

24. The apparatus according to claim 23, wherein the first color-component image data is image data of a first color-component image formed first, and the second color-component image data is image data of a second color-component image formed thereafter.

25. The apparatus according to claim 24, wherein said first correcting means applies a correction to reduce the density value of the first color-component image data upon taking into consideration a light-shielding characteristic of the first color-component image.

26. The apparatus according to claim 24, wherein said second correcting means applies a correction to increase the density value of the second color-component image data upon taking into consideration a light-shielding characteristic of the first color-component image.

27. The apparatus according to claim 23, wherein the density limit value is a density value of image data which corresponds to maximum density capable of being achieved by said image forming apparatus.

28. The apparatus according to claim 27, wherein said control means selects the corrected first color-component data when the results of comparison indicate that the density value of the corrected second color-component data is greater than the density limit value, and selects the first color-component data, which has been separated by said separating means, when the results of comparison indicate that the density value of the corrected second color-component data is equal to or less than the density limit value.

29. An image processing method for supplying image data to an image forming apparatus which forms an image by superimposing recording agents of at least two colors, comprising:

a separating step of separating color image data into image data of at least two color components;

a correcting step of subjecting the image data separated from the color image data at said separating step to a correction which takes into consideration a light-shielding characteristic of an image formed in accordance with one of at least two color components; and a distributing step of distributing, to at least one pixel surrounding a pixel of interest, a difference between the image data corrected at said correcting step and image data before correction.

30. An image processing method for supplying image data to an image forming apparatus which collectively forms images of at least two colors, comprising:

a separating step of separating color image data into image data of at least two color components;

a correcting step of subjecting the image data separated from the color image data at said separating step to a correction which takes into consideration a light-shielding characteristic of an image formed in accordance with one of at least two color components; and a distributing step which, in a case where image data corrected at said correcting step exceeds a correction limit, is for distributing a difference between a density limit value and the image data to at least one pixel surrounding a pixel of interest.

31. An image processing method for supplying image data to an image forming apparatus which forms an image by superimposing recording agents of at least two colors, comprising:

a separating step of separating color image data into image data of at least two color components;

a correcting step of subjecting the image data separated from the color image data at said separating step to a correction which takes into consideration a light-shielding characteristic of an image formed in accordance with one of at least two color components;

a predicting step of predicting density of an image formed by the image data corrected at said correcting step; and a distributing step of distributing, to at least one pixel surrounding a pixel of interest, a difference between results of prediction at said predicting means and image data before correction.

32. An image processing method for supplying image data to an image forming apparatus which collectively forms images of at least two colors, comprising:

a separating step of separating color image data into image data of at least two color components;

a first correcting step of correcting first color-component data separated from the color image data at said separating step;

a second correcting step of correcting second color-component data separated from the color image data at said separating step;

a comparing step of comparing a density value of the second color-component data corrected at said second correcting step and a density limit value; and a control step of controlling correction of the first color-component data, which has been separated at said separating step, by said first correcting means in dependence upon results of the comparison performed at said comparing step.

* * * * *